United States Patent [19]

Saito et al.

[11] Patent Number: 4,804,911
[45] Date of Patent: Feb. 14, 1989

[54] ELECTROMAGNETIC POWER GENERATING TYPE ROTATION SENSOR

[75] Inventors: Hidetoshi Saito; Masahiro Kume, both of Itami; Sakae Morita, Tokyo, all of Japan

[73] Assignees: Sumitomo Electric Industries, Ltd., Osaka; Sanken Airpax Ltd., Tokyo, both of Japan

[21] Appl. No.: 55,717

[22] Filed: May 29, 1987

[30] Foreign Application Priority Data

May 30, 1986 [JP] Japan .................. 61-126602

[51] Int. Cl.[4] .............................................. G01P 3/42
[52] U.S. Cl. ..................................... 324/167; 324/173; 324/208
[58] Field of Search ............... 324/167, 166, 173, 174, 324/207, 208

[56] References Cited

U.S. PATENT DOCUMENTS

| 3,177,711 | 4/1965 | Ham et al. ............... 324/173 X |
| 3,680,379 | 8/1972 | Boyd et al. ............... 324/174 X |
| 3,980,913 | 9/1976 | Peterson . | |
| 4,563,643 | 1/1986 | Leschek et al. ............ 324/207 |
| 4,721,864 | 1/1988 | Goossens ................. 324/174 X |

FOREIGN PATENT DOCUMENTS 2255960 5/1974 Fed. Rep. of Germany .
2153534 8/1985 United Kingdom .

Primary Examiner—Reinhard J. Eisenzopf
Assistant Examiner—Robert W. Mueller
Attorney, Agent, or Firm—W. G. Fasse; D. H. Kane, Jr.

[57] ABSTRACT

An electromagnetic power generating type rotation sensor has a magnetic pole which is divided into an inner magnetic pole piece and an outer magnetic pole piece (3a, 13a) located in a position close to an outer peripheral part or a side part of a magnetic rotator. The inner magnetic pole piece (3b, 13b) is located adjacent to the outer magnetic pole piece but inside the sensor so as not to be exposed to the external environment.

5 Claims, 1 Drawing Sheet

ELECTROMAGNETIC POWER GENERATING TYPE ROTATION SENSOR

BACKGROUND OF THE INVENTION

1. Field of the Invention

The present invention relates to an electromagnetic power generating type rotation sensor for detecting the rotational speed of a rotating member such as the wheel of an automobile.

2. Description of the Prior Art

In general several types of sensors are known, such as an electromagnetic power generating type rotation sensor, a magnetic rotation sensor employing a magnetic resistor element or a Hall element, and a photoelectric rotation sensor. All of these sensors types can be used for detecting the rotational speed of a rotating member such as the wheel of an automobile. The electromagnetic power generating type rotation sensor comprises a magnet, a magnetic pole piece and a voltage generating coil integrally contained in a case of metal or resin. The amount of magnetic flux in the magnetic pole piece is changed by the irregular surface of a magnetic gear serving as a magnetic rotator in proximity to the magnetic pole piece for generating an AC voltage across a coil. The AC voltage thus generated is substantially proportionate to the number of revolutions of the magnetic gear while the frequency thereof is correctly proportionate to the number of revolutions of the magnetic gear, whereby the rotational speed can be detected by the generated AC voltage or the frequency thereof.

FIG. 3 is a sectional view showing a conventional electromagnetic power generating type rotation sensor 21 including a magnet 22, a magnetic pole piece 23, a coil 24, a bobbin 25, a housing 26, an output lead wire 27, a bracket 28 of resin for mounting the sensor, a filler member 28a also made of resin and a magnetic gear 29. The magnetic gear 29 is mounted on a drive shaft of an automobile or the like so that the magnetic gear 29 will rotate with the wheel of the automobile.

Magnetic flux of the magnet 22 passes through the magnetic pole piece 23, and the amount of such magnetic flux is changed depending on the closeness of the irregular surface, i.e., projections and recesses of the outer peripheral part 29 of the magnetic rotator. Depending on the rate of change in the amount of magnetic flux as a function or time, an output voltage is generated across the coil 24, so that the rotational speed of the magnetic rotator which closely related to the rotational speed of the wheel, can be detected from the variation in the frequency of the output voltage.

Detection of the rotational speed of the wheel is important for brake control of the wheel such as an antilock control, and hence it is necessary to detect the rotational speed of the wheel in a reliable under various conditions from low-speed to high-speed conditions. The electromagnetic power generating type rotation sensor is employed for an automobile or the like since the same can be manufactured at a relatively low cost and is resistant against temperature change.

Such an electromagnetic power generating type rotation sensor employed for measuring the speed of an autmobile must have a excellent corrosion resistance since the same is mounted on a wheel part where it is exposed to a bad environment. Thus, the magnetic pole piece must be made of an anticorrosive material. Further, such a sensor is adapted to defect the rotational speed of the wheel from the change in the amount of magnetic flux in the magnetic pole piece as hereinabove described, and hence the material for the magnetic pole piece must have an excellent magnetic property, i.e., a good saturation magnetic flux density. Thus, it is preferable that the material for the magnetic pole piece has an excellent magnetic property and an excellent corrosion resistance.

However, a material having a high saturation magnetic flux density is generally inferior in corrosion resistance against rusting or the like, whereby conventional magnetic pole pieces have not sufficiently satisfied both of the aforementioned conditions.

SUMMARY OF THE INVENTION

Accordingly, it is an object of the present invention to provide an electromagnetic power generating type rotation sensor satisfactorily applicable to an automobile, by employing a magnetic pole piece which has an excellent magnetic property and a good corrosion resistance.

In an electromagnetic power generating type rotation sensor according to the present invention, the magnetic pole piece is divided into an outer magnetic pole piece and an inner magnetic pole piece, whereby the outer magnetic pole piece is located opposite to an irregular surface of a magnetic rotator and the inner magnetic pole piece is located adjacent to the outer magnetic pole piece but in an inward position so as not to be exposed to the external environment. The irregular surface may be provided on the outer peripheral part or the side part of the magnetic rotator.

Since in the electromagnetic power generating type rotation sensor according to the present invention, the inner magnetic pole piece is not exposed to the external environment, this inner magnetic pole piece can be made of a material having an excellent magnetic property with our regard to any corrosion resistance.

Further, the outer magnetic pole piece can be made of a material of excellent corrosion resistance, substantially with no consideration regarding its magnetic property. According to the present invention, the magnetic pole piece is thus divided into two parts with different characteristics which cannot be obtained by making the entire pole piece of a single material.

These and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE INVENTION

Figure 1:
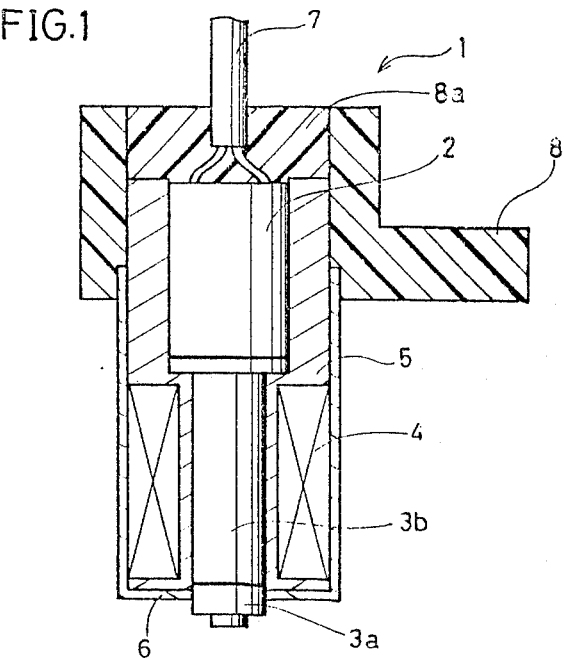
FIG. 1 is a sectional view showing an embodiment of the present invention.

Referring to FIG. 1, an end of an inner magnetic pole piece 3b is mounted on a magnet 2, which is contained in an inner casing 5 with the inner magnetic pole piece 3b. An outer magnetic pole piece 3a is closely joined with the other end of the inner magnetic pole piece 3b by welding, to avoid any clearance between the inner and outer pole pieces 3b and 3a. The inner magnetic pole piece 3b is made of electromagnetic soft iron, which is inferior in corrosion resistance but has an excellent magnetic property. The outer magnetic pole piece 3a is made of SUS430 stainless steel, which is a magnetic material of excellent corrosion resistance.

A coil 4 is formed by wire wound around the outer periphery of the inner casing 5 in which the inner magnetic pole piece 3b is located. Both ends of the coil 4 are connected to an output lead cable 7, to provide an output voltage generated across the coil 4. The inner casing 5 and the coil 4 are contained in an outer housing 6, and the outer magnetic pole piece 3a partially projects from the housing 6. The outer magnetic pole piece 3a and the housing 6 are sealed by welding so that the interior of the housing 6 is not exposed to the external environment. A cylindrical bracket 8 for mounting the entire sensor is provided in an outer part of the inner casing 5. The interior of the bracket 8 is filled with a resin filler part 8a.

The just described embodiment can be manufactured by the following steps, for example:

First, a cylindrical spacer, which is longer than the depth of the outer housing 6, is inserted into the cylindrical outer housing 6. Thereafter the bracket 8 of, e.g., nylon resin is formed by injection molding. Then the spacer is taken out of the housing 6, to obtain a cylindrical body having the shape of the housing 6 and connected with the bracket 8. A sensor element in the form of the magnet 2, the inner magnetic pole piece 3b, the outer magnetic pole piece 3a, the bobbin 5, the coil 4, and the output lead cable 7 connected thereto are inserted into the cylindrical body. Then the interior of the bracket 8 is filled with resin such as epoxy resin, to form the filler part 8a.

In the embodiment as shown in FIG. 1, the inner magnetic pole piece 3b is provided within the outer housing 6 not to be exposed to the external environment as hereinabove described, whereby the inner magnetic pole piece 3b does not corrode or the like even if the same is made of electromagnetic soft iron, which is inferior in corrosion resistance. Further, the outer magnetic pole piece 3a which is exposed to the external environment, is made of stainless steel magnetic material (SUS430) having an excellent in corrosion resistance, whereby the same can beemployed in a bad environment without corroding.

In addition, the inner magnetic pole piece 3b and the outer magnetic pole piece 3a are closely joined with each other by welding, thereby to avoid an increase in magnetic resistance between the magnetic pole pieces 3a and 3b.

Although the inner magnetic pole piece 3b is made of electromagnetic soft iron of excellent magnetic property in the embodiment as shiown in FIG. 1, the material for making the inner pole piece is not restricted to electromagnetic soft iron, but a material of slightly inferior mechanical strength can also be employed for making the inner pole piece of the present invention as long as the same has an excellent magnetic property. Further, although the outer magnetic pole piece 3a is made of stainless steel magnetic material (SUS430) in the aforementioned embodiment, the same can be made of other material provided the material has an excellent corrosion resistance.

Figure 2:
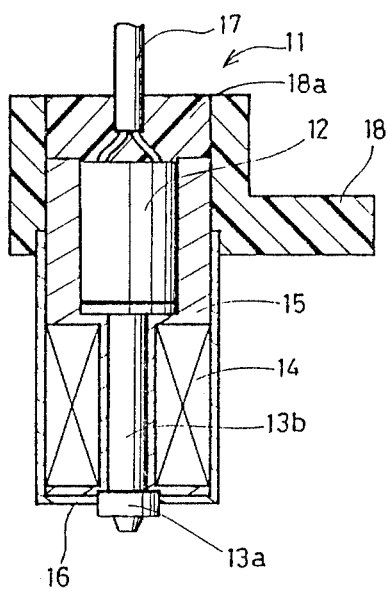
FIG. 2 is a sectional view showing another embodiment of the present invention.
Figure 3:
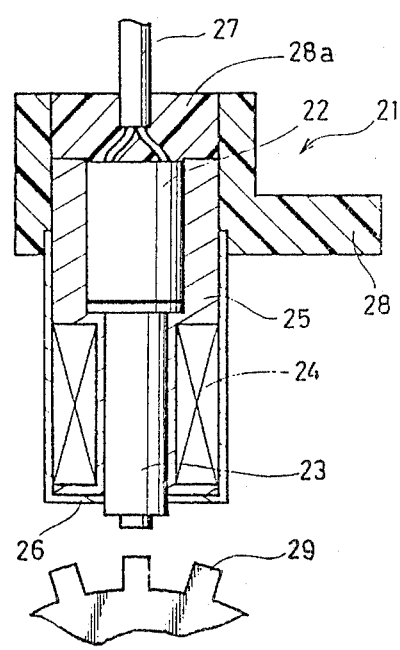
FIG. 3 is a sectional view showing a conventional electromagnetic power generating type rotation sensor.

FIG. 2 shows an embodiment with an outer magnetic pole piece 13a that is larger in diameter than an inner magnetic pole piece 13b. The remaining structure is substantially similar to that of the embodiment of FIG. 1. Thus, a sensor element is formed by a magnet 12, the inner magnetic pole piece 13b, the outer magnetic pole piece 13a, a bobbin 15 and a coil 14 is contained in a casing 16. A bracket 18 and an output cable 17 are connected to the sensor element while a resin filler member 18a is located in the bracket 18.

The outer magnetic pole piece 13a may be made of a material of inferior magnetic property since its corrosion resistance is more important. In such case, the outer magnetic pole piece 13a can be made larger in diameter than the inner magnetic pole piece 13b as shown in FIG. 2, to somewhat compensate for the reduction in magnetic property.

Although the present invention has been described and illustrated in detail, it is clearly understood that the same is by way of illustration and example only and is not to be taken by way of limitation, the spirit and scope of the present invention being limited only by the terms ofthe appended claims.

What is claimed is:

1. An electromagnetic power generating type rotation sensor comprising a housing, a magnetic rotator mounted on an object the rotation of which is to be detected, said magnetic rotator having an irregular surface on at least one of its outer peripheral part and its side part; a magnetic pole means arranged in proximity to said irregular surface of said magnetic rotator for alternately cooperating with projections and recesses of said irregular surface to change the amount of magnetic flux; and a coil (4, 14) for generating an AC output voltage responsive to said change in the amount of magnetic flux of said magnetic pole means for determining the rotational speed of said object from said AC output voltage, said magnetic pole means being divided into an outer magnetic pole piece (3a, 13a) made of a magnetic yet corrosion resistant material and located in a position close to said irregular surface of said magnetic rotator, and an inner magnetic pole piece (3b, 13b) made of a magnetic material having a lower corrosion resistance than said outer magnetic pole piece, said inner magnetic pole piece of lower corrosion resistance being located adjacent to said outer magnetic pole piece but inside said housing and inwardly of said outer magnetic pole piece to protect said inner magnetic pole piece from the external environment.

2. The electromagnetic power generating type rotation sensor of claim 1, wherein said inner magnetic pole piece (3b, 13b) is made of a material superior in magnetic property to that of said outer magnetic pole piece (3a, 13a).

3. The electromagnetic power generating type rotation sensor of claim 1, wherein said outer magnetic pole piece (3a, 13a) is larger in diameter than said inner magnetic pole piece (3b, 13b).

4. The electromagnetic power generating type rotation sensor of claim 1, wherein said outer magnetic pole piece (3a, 13a) and said inner magnetic pole piece (3b, 13b) are closely joined to each other by welding.

5. The electromagnetic power generating type rotation sensor of claim 1, wherein said outer magnetic pole piece (3a, 13a) is made of a magnetic stainless steel and said inner magnetic pole piece (3b, 13b) is made of electromagnetic soft iron.

* * * * *